United States Patent Office 3,377,385
Patented Apr. 9, 1968

3,377,385
STABILIZED POLYOXYALKYLENE POLYOLS
Takesi Turumaru, Takarazuka, Masaru Yotsuzuka, Nishinomiya, and Katsuhiko Ogino, Suita, Japan, assignors to Takeda Chemical Industries, Ltd., Osaka, Japan
No Drawing. Continuation of application Ser. No. 343,226, Feb. 7, 1964. This application Apr. 24, 1967, Ser. No. 633,303
7 Claims. (Cl. 260—611.5)

This application is a continuation of application Ser. No. 343,226 filed Feb. 7, 1964, and now abandoned.

This invention relates to a novel technic for stabilizing polyoxyalkylene polyol, and more particularly to the technic of stabilizing polyoxyalkylene polyol with the aid of biphenol, as stabilizer. The invention also relates to the thus-prepared stabilized polyoxyalkylene polyol compositions.

The polyoxyalkylene polyols are well known high molecular compounds useful as emulsifiers, synthetic lubricants, detergents, starting materials for the preparation of polyurethane plastics, etc. Conventionally synthesized polyoxyalkylene polyol is readily subject to degradation or decomposition when exposed for any considerable length of time to air or to the action of ultraviolet rays, and this degradation or decomposition is enhanced at raised temperatures. When polyoxyalkylene polyol is heated in the air, it undergoes a remarkable decrease in weight, apparently due to the formation of degradation or decomposition products in the form of lower molecular compounds which are relatively volatile and evaporate readily into the air. Moreover, when polyoxyalkylene polyol is kept at room temperature in air for some time, e.g. ten to twenty days or longer, an aldehyde-like or dioxane-like odor is developed. Such degraded polyoxyalkylene polyol gives a positive reaction to fuchsin-aldehyde reagent, whereas refined (undecomposed and not degraded) polyoxyalkylene polyol gives neither an aldehyde-like odor nor a positive reaction to fuchsin-aldehyde reagent. In addition to the described changes, the chemical breakdown resulting from degradation or decomposition of polyoxyalkylene polyol is also manifested by increase in acid value, decrease in viscosity, etc.

The aforesaid instability of polyoxyalkylene polyol has the result that the employment thereof is bound up with numerous inconveniences. For example, in the production of urethane foam, the use of deteriorated polyoxyalkylene polyol prevents a smooth reaction. Furthermore, urethane foam produced from deteriorated polyoxyalkylene polyol is of inferior quality.

In the circumstances, it is a desideratum in the art to provide means for preventing degradation or decomposition of polyoxyalkylene polyol and thereby to keep constant the chemical and physical properties of the polymer. The present invention is addressed to satisfying the said desideratum. Briefly stated, this has been accomplished by the incorporation into the polyoxyalkylene polyol of an effective quantity of biphenol.

A primary object of the invention is to develop simple means for protecting polyoxyalkylene polyol against degradation or decomposition. A further object of the invention is to provide stabilized polyoxyalkylene polyol compositions which can be satisfactorily employed in all the known uses for polyoxyalkylene polyol.

As previously indicated, these objects are realized by the incorporation of biphenol into polyoxyalkylene polyol.

Any biphenol may be used as the stabilizer according to this invention; thus, use may be made of o,o'-biphenol, p,p'-biphenol o,p'-biphenol, etc., and these may be used severally or in admixture with each other or with known stabilizer(s).

The expression "polyoxyalkylene polyol" in this specification refers to the reaction product of alkylene oxide and a compound having one or more reactive hydrogen atoms or its mono- di- or poly-alkyl ethers. Suitable alkylene oxides are lower alkylene oxides and comprise ethylene oxide, propylene oxide, butylene oxide, etc. Arylene oxides such as styrene oxide, etc. can also be used. The polyoxyalkylene polyols involved in the present invention have a molecular weight within the range from about 350 to 8000, especially from about 750 to 4000, and also have hydroxyl number within the range from about 30 to 600; these apply also to the polyoxystyrene polyols. Illustrative of the compounds having one or more active hydrogen atoms are water, aliphatic mono-, di- or polyhydric alcohols, e.g. methyl alcohol, ethyl alcohol, propyl alcohol, butyl alcohol, hexyl alcohol, octyl alcohol, ethylene glycol, propylene glycol, diethylene glycol, dipropylene glycol, triethylene glycol, tripropylene glycol, glycerol, hexanetriol, pentaerythritol, sorbitol, trimethylol propane; aliphatic or aromatic mono-, di- or tri-amines, e.g. stearylamine, ethylenediamine, diethylenetriamine, hexamethylenediamine, phenylenediamine; aliphatic compounds having amino and hydroxyl groups, e.g. ethanolamines, propanolamines; aliphatic compounds having a mercapto group, e.g. dodecylmercaptan, 2,3-dimercapto-1-propanol; and aromatic compounds having one or more hydroxyl groups, e.g. 1,1,3-tris-(p-hydroxyphenyl)propane, 1,1,2,2-tetrakis - (p - hydroxyphenyl)propane, 4,4' - isopropylidenediphenol. Moreover, mixtures of polyoxyalkylene polyols may effectively be stabilized by the method of this invention.

The quantity of biphenol, which can exhibit the objective stabilizing effect on the polymer is 0.01–1 percent by weight relative to polyoxyalkylene polyol to be stabilized, preferably 0.05–0.1 percent by weight in general. However, this value is not restrictive and any quantity of more than 1% of biphenol relative to polyoxyalkylene polyol may be employed in the methods of the invention with satisfactory results. Generally, the use of less than 0.01% of biphenol is not effective in stabilizing polyoxyalkylene polyol.

The addition of the biphenol to the polyoxyalkylene polyols may conveniently be carried out in a variety of ways. The addition may be made in the solid state, or as a solution in which biphenol is dissolved in a suitable solvent such as methyl alcohol, ethyl alcohol, benzene, etc. The addition may be carried out during or after the process of refining of polyoxyalkylene polyol, though in the former case care should be taken that the addition is carried out at least after the neutralization of alkaline catalyst employed for the polymerization. When biphenol is employed in a state of solution, the solvent may be removed under heating in an atmosphere of an inert gas, after mixing biphenol sufficiently with the polyoxyalkylene polyol. When biphenol is added to polyoxyalkylene polyol directly, i.e. in solid form and not in solution in a solvent, the biphenol is mixed thoroughly by heating in an atmosphere of an inert gas to dissolve the biphenol uniformly in the polyoxyalkylene polyol.

Polyoxyalkylene polyols thus stabilized are very effectively protected against degradation or decomposition in comparison with those stabilized with known stabilizer for polyoxyalkylene polyol.

The following results show the effect on stabilizing polyoxyalkylene polyol:

STABILIZER (1) Solution of 0.1 part by weight of p-p'-biphenol in 10 parts by volume of methanol.
(2) Solution of 0.1 part by weight of dibutyl-hydroxytoluene in 10 parts by volume of methanol.

(3) Solution of 0.1 part by weight of butyl-hydroxy-anisol in 10 parts by volume of methanol.

METHOD OF MEASUREMENT 100 parts each by weight of polyoxypropylene glycol whose average molecular weight is 2000 is mixed well with stabilizer solution, followed by removal of the methanol at 70° C. in an atmosphere of nitrogen gas. Then, the compositions thus stabilized are kept at 120° C. with the aid of an infrared lamp. Decrease in the weight of the compositions are then measured. For purposes of comparison, the stability of polyoxyalkylene polyol is similarly observed without the addition of any stabilizer (control).

RESULT

| Stabilizer | Percent of decrease in weight of polyoxypropylene glycol composition | | | | | |
|---|---|---|---|---|---|---|
| | 2 hrs. | 4 hrs. | 6 hrs. | 8 hrs. | 10 hrs. | 12 hrs. |
| (1) p,p'-biphenol | 0.1 | 0.2 | 0.4 | 0.5 | 0.6 | 1.0 |
| (2) dibutyl-hydroxy-toluene | 0.2 | 0.6 | 3.0 | | | |
| (3) butyl-hydroxy-anisol | 0.2 | 0.3 | 0.4 | 0.6 | 1.8 | 4.0 |
| Control | 2.0 | 4.7 | | | | |

From the foregoing, it can be seen that biphenol has an excellent effect in the stabilization of polyoxyalkylene polyol.

The following examples represent presently preferred illustrative non-limitative embodiments of the invention. In the examples, all percentages are in weight percent, unless otherwise mentioned, and the relationship between part by weight and part by volume is the same as that between gram and milliliter.

Example 1

0.1 part of o,p'-biphenol is dissolved in 100 parts of refined polyoxypropylene glycol (average molecular weight: 2000), from which no aldehyde is detected, with agitation under heating in an atmosphere of nitrogen gas. The product is stabilized polyoxypropylene glycol composition, according to this invention.

Even after this stabilized composition is kept at 60° C. for a week, addition of fuchsin-aldehyde reagent to the composition gives no significant color reaction. In contrast, polyoxypropylene glycol which is not stabilized is colored strongly to red soon after the addition of fuchsin-aldehyde reagent, when treated in the same way as the stabilized composition.

Example 2

0.05 part of p,p'-biphenol is dissolved in 100 parts of refined polyoxypropylene triol (average molecular weight: 3000), from which no aldehyde is detected, with agitation under heating in an atmosphere of nitrogen gas to obtain stabilized polyoxypropylene triol composition.

Example 3

After the neutralization of the alkaline catalyst contained in 100 parts of polyoxypropylene glycol (average molecular weight: 2000) with 10% sulfuric acid and the removal of excess sulfuric acid, a solution of 50 parts by volume of benzene in which 0.1 part of p,p'-biphenol is dissolved, is added thereto to make an homogeneous mixture, followed by washing thoroughly with water. The benzene is removed, leaving behind stabilized polyoxypropylene glycol composition.

Example 4

To 100 parts of polyoxypropylene glycol whose average molecular weight is 2000, is added a solution of 5 parts by volume of methanol in which 0.1 part of p,p'-biphenol is dissolved, and mixed well to make the mixture homogeneous. Then the methanol is removed at 70° C. in an atmosphere of nitrogen gas, leaving behind stabilized polyoxypropylene glycol composition.

Example 5

0.05 part of p,p'-biphenol is dissolved in 100 parts of refined polyoxypropylene hexanol (average molecular weight: 750, OH-number: 450), from which no aldehyde is detected, with agitation under heating at 60° C. in an atmosphere of nitrogen gas to obtain stabilized polyoxypropylene hexanol composition.

What is claimed is:

1. Stabilized polyoxyalkylene polyol consisting essentially of a uniform admixture of p,p'-biphenol and of polyoxyalkylene polyol having an average molecular weight of 350 to 8000, the p,p'-biphenol constituting at least 0.05% by weight of the admixture, the alkylene being lower alkylene.
2. Stabilized polyoxyalkylene polyol as in claim 1 wherein the p,p'-biphenol constitutes about 0.05 to 1% by weight of the admixture.
3. Stabilized polyoxyalkylene polyol as in claim 1 wherein the p,p'-biphenol constitutes about 0.05 to 0.1% by weight of the admixture.
4. Stabilized polyoxyalkylene polyol as in claim 1 wherein the polyoxyalkylene polyol is polyoxypropylene glycol having an average molecular weight of about 2000 and the p,p'-biphenol constitutes about 0.1% by weight of the admixture.
5. Stabilized polyoxyalkylene polyol as in claim 1 wherein the polyoxyalkylene polyol is polyoxypropylene triol having an average molecular weight of about 3000 and the p,p'-biphenol constitutes about 0.05% by weight of the admixture.
6. Stabilized polyoxyalkylene polyol as in claim 1 wherein the polyoxyalkylene polyol is polyoxypropylene hexanol having an average molecular weight of about 750 and the p,p'-biphenol constitutes about 0.05% by weight of the admixture.
7. Stabilized polyoxystyrene polyol consisting essentially of a uniform admixture of p,p'-biphenol and of polyoxystyrene polyol having an average molecular weight of about 350 to 8000, the p,p'-biphenol constituting at least 0.05% by weight of the admixture.

References Cited

UNITED STATES PATENTS 2,074,993 3/1937 Sibley.
2,481,278 9/1949 Ballard et al.
2,641,614 6/1953 Britton et al. _____ 260—611.5
2,687,378 8/1954 Goldschmidt et al.
260—611.5 XR BERNARD HELFIN, *Primary Examiner.*